(12) United States Patent
Marietta

(10) Patent No.: US 9,104,472 B2
(45) Date of Patent: Aug. 11, 2015

(54) WRITE TRANSACTION INTERPRETATION FOR INTERRUPT ASSERTION

(71) Applicant: Bryan D. Marietta, Cedar Park, TX (US)

(72) Inventor: Bryan D. Marietta, Cedar Park, TX (US)

(73) Assignee: Freescale Semiconductor, Inc., Armonk, NY (US)

( * ) Notice: Subject to any disclaimer, the term of this patent is extended or adjusted under 35 U.S.C. 154(b) by 328 days.

(21) Appl. No.: 13/758,268

(22) Filed: Feb. 4, 2013

(65) Prior Publication Data

US 2014/0223059 A1 Aug. 7, 2014

(51) Int. Cl.
G06F 13/24 (2006.01)
G06F 9/48 (2006.01)

(52) U.S. Cl.
CPC ............. *G06F 9/4812* (2013.01); *G06F 13/24* (2013.01)

(58) Field of Classification Search
CPC ............................... G06F 9/4812; G06F 13/24
See application file for complete search history.

(56) References Cited

U.S. PATENT DOCUMENTS

| | | | |
|---|---|---|---|
| 5,848,279 A | 12/1998 | Wu et al. | |
| 2002/0029358 A1 | 3/2002 | Pawlowski et al. | |
| 2006/0251109 A1* | 11/2006 | Muller et al. | 370/463 |
| 2008/0082713 A1* | 4/2008 | Tsuruta | 710/268 |
| 2008/0109564 A1* | 5/2008 | Arndt et al. | 710/3 |
| 2008/0155137 A1* | 6/2008 | Muppirala et al. | 710/39 |
| 2010/0268905 A1 | 10/2010 | Reipold et al. | |
| 2011/0072220 A1 | 3/2011 | Marietta et al. | |
| 2012/0036298 A1* | 2/2012 | Lais et al. | 710/260 |
| 2013/0080673 A1* | 3/2013 | Feehrer et al. | 710/268 |
| 2013/0262726 A1* | 10/2013 | Zheng | 710/264 |
| 2014/0122759 A1* | 5/2014 | Machnicki et al. | 710/261 |
| 2014/0237144 A1* | 8/2014 | Chew | 710/50 |

OTHER PUBLICATIONS

"PCI Local Bus Specification". Revision 3.0. Feb. 3, 2004. PCI-SIG. Section 6.8 "Message Signaled Interrupts". pp. 2 and 231-253.*
Freescale Semiconductor, Inc., Hardware and Software Assists in Virtualization White Paper, Rev 0, Aug. 2009.
B. D. Marietta et al., U.S. Appl. No. 13/460,287, filed Apr. 30, 2012, entitled Virtualized Instruction Extension for System Partitioning.
B. D. Marietta et al., U.S. Appl. No. 13/485,120, filed May 31, 2012, entitled Virtualized Interrupt Delay Mechanism.
B. D. Marietta et al., U.S. Appl. No. 13/570,843, filed Aug. 9, 2012, entitled Interrupt Priority Management Using Partition-Based Priority Blocking Processor Registers.
B. D. Marietta et al., U.S. Appl. No. 13/570,874, filed Aug. 9, 2012, entitled Processor Interrupt Interface with Interrupt Partitioning and Virtualization Enhancements.

* cited by examiner

*Primary Examiner* — Thomas J Cleary
(74) *Attorney, Agent, or Firm* — Terrile, Cannatti, Chambers & Holland, LLP; Michael Rocco Cannatti

(57) ABSTRACT

A method and circuit for a data processing system (12) provide a virtualized programmable interrupt control system (70) which processes interrupt event reports from interrupt sources (e.g., 14, 40) which generate write transactions to an address for an interrupt event register (80) which is authenticated and then interpreted based on the current state of the targeted interrupt to generate the next state using an interpretation table (306) and predetermined configuration/state bits (310-314).

19 Claims, 5 Drawing Sheets

| SIGNALING MODE | | INITIAL STATE | | CURRENT STATE | | NEXT STATE | | DESCRIPTION |
|---|---|---|---|---|---|---|---|---|
| EDG | POL | SNS | EVT | IRS | EVT | IRS | EVT | IRS | |
| EDGE-TRIGGERED | | | | | | | | |
| 1 | X | X | 0 (FALL) | 0 (INACTIVE) | 0 (FALL) | 0 (INACTIVE) | 0 (FALL) | 1 (ACTIVE) | NEW INTERRUPT SIGNALED |
| 1 | X | X | 0 (FALL) | 0 (INACTIVE) | 1 (RISE) | 1 (ACTIVE) | 0 (FALL) | 1 (ACTIVE) | NOT WELL-BEHAVED, BUT LEGAL BEHAVIOR FOR PCI- EXPRESS MSI/MSI-X (SEE SECTION 6.8.3.6 OF THE REV3 PCI SPEC) |
| 1 | X | X | 0 (FALL) | 0 (INACTIVE) | 1 (RISE) | X | 1 (RISE) | X | ILLEGAL CURRENT STATE |
| FALLING EDGE-TRIGGERED | | | | | | | | |
| 0 | 0 | 0 | 1 (RISE) | 0 (INACTIVE) | 0 (FALL) | 0 (INACTIVE) | 1 (RISE) | 0 (INACTIVE) | RESET TRIGGER (READY FOR A NEW INTERRUPT EVENT) |
| 0 | 0 | 0 | 1 (RISE) | 0 (INACTIVE) | 0 (FALL) | 1 (ACTIVE) | 1 (RISE) | 1 (ACTIVE) | RESET TRIGGER (READY FOR A NEW INTERRUPT EVENT) |
| 0 | 0 | 0 | 1 (RISE) | 0 (INACTIVE) | 1 (RISE) | 0 (INACTIVE) | 0 (FALL) | 1 (ACTIVE) | NEW INTERRUPT SIGNALED |
| 0 | 0 | 0 | 1 (RISE) | 0 (INACTIVE) | 1 (RISE) | 1 (ACTIVE) | 0 (FALL) | 1 (ACTIVE) | WON'T SEE THIS FOR WELL-BEHAVED SOURCE |
| ACTIVE-LOW LEVEL-SENSITIVE (NOTE - THIS IS A SIMPLE TOGGLE) | | | | | | | | |
| 0 | 0 | 1 | 1 (RISE) | 0 (INACTIVE) | 0 (FALL) | 0 (INACTIVE) | 1 (RISE) | 0 (INACTIVE) | ILLEGAL CURRENT STATE |
| 0 | 0 | 1 | 1 (RISE) | 0 (INACTIVE) | 0 (FALL) | 1 (ACTIVE) | 1 (RISE) | 0 (INACTIVE) | DE-ASSERT |
| 0 | 0 | 1 | 1 (RISE) | 0 (INACTIVE) | 1 (RISE) | 0 (INACTIVE) | 0 (FALL) | 1 (ACTIVE) | NEW INTERRUPT SIGNALED |
| 0 | 0 | 1 | 1 (RISE) | 0 (INACTIVE) | 1 (RISE) | 1 (ACTIVE) | 0 (FALL) | 1 (ACTIVE) | ILLEGAL CURRENT STATE |
| RISING EDGE-TRIGGERED | | | | | | | | |
| 0 | 1 | 0 | 0 (FALL) | 0 (INACTIVE) | 0 (FALL) | 0 (INACTIVE) | 1 (RISE) | 1 (ACTIVE) | NEW INTERRUPT SIGNALED |
| 0 | 1 | 0 | 0 (FALL) | 0 (INACTIVE) | 0 (FALL) | 1 (ACTIVE) | 1 (RISE) | 1 (ACTIVE) | WON'T SEE THIS FOR WELL-BEHAVED SOURCE |
| 0 | 1 | 0 | 0 (FALL) | 0 (INACTIVE) | 1 (RISE) | 0 (INACTIVE) | 0 (FALL) | 1 (ACTIVE) | RESET TRIGGER (READY FOR A NEW INTERRUPT EVENT) |
| 0 | 1 | 0 | 0 (FALL) | 0 (INACTIVE) | 1 (RISE) | 1 (ACTIVE) | 0 (FALL) | 1 (ACTIVE) | RESET TRIGGER (READY FOR A NEW INTERRUPT EVENT) |
| ACTIVE-HIGH LEVEL-SENSITIVE (NOTE - THIS IS A SIMPLE TOGGLE) | | | | | | | | |
| 0 | 1 | 1 | 0 (FALL) | 0 (INACTIVE) | 0 (FALL) | 0 (INACTIVE) | 1 (RISE) | 1 (ACTIVE) | NEW INTERRUPT SIGNALED |
| 0 | 1 | 1 | 0 (FALL) | 0 (INACTIVE) | 0 (FALL) | 1 (ACTIVE) | 1 (RISE) | 1 (ACTIVE) | ILLEGAL CURRENT STATE |
| 0 | 1 | 1 | 0 (FALL) | 0 (INACTIVE) | 1 (RISE) | 0 (INACTIVE) | 0 (FALL) | 0 (INACTIVE) | ILLEGAL CURRENT STATE |
| 0 | 1 | 1 | 0 (FALL) | 0 (INACTIVE) | 1 (RISE) | 1 (ACTIVE) | 0 (FALL) | 0 (INACTIVE) | DE-ASSERT |

FIG. 4

WRITE TRANSACTION INTERPRETATION FOR INTERRUPT ASSERTION

BACKGROUND OF THE INVENTION

1. Field of the Invention

The present invention is directed in general to data processing systems. In one aspect, the present invention relates to interrupt signaling, reception, and management in a data processing system.

2. Description of the Related Art

With conventional data processing systems, an interrupt request from an interrupt source was asserted or signaled to interrupt controller using signal transitions on one or more dedicated interrupt wires. The interrupt assertion could be indicated by the logic level of the signal, a change in state of the wire, or a rising or falling edge. Likewise, interrupt de-assertion events were also reported using the physical interrupt wire(s). In this way, an interrupt assertion or de-assertion event could be supplied across the dedicated physical wire(s) by changing a state of an interrupt signal at the interrupt source to report the interrupt event to the interrupt controller. As the number and complexity of potential interrupt sources and/or interrupt controllers increases with newer data processing systems, the complexity requirements for interrupt management increase, as does the die area and wiring required for the interrupt system to provide dedicated interrupt wire(s).

BRIEF DESCRIPTION OF THE DRAWINGS

The present invention may be understood, and its numerous objects, features and advantages obtained, when the following detailed description of a preferred embodiment is considered in conjunction with the following drawings, in which:

FIG. 4 is an example write transaction interpretation table in accordance with selected embodiments of the present invention.

DETAILED DESCRIPTION

Figure 1:
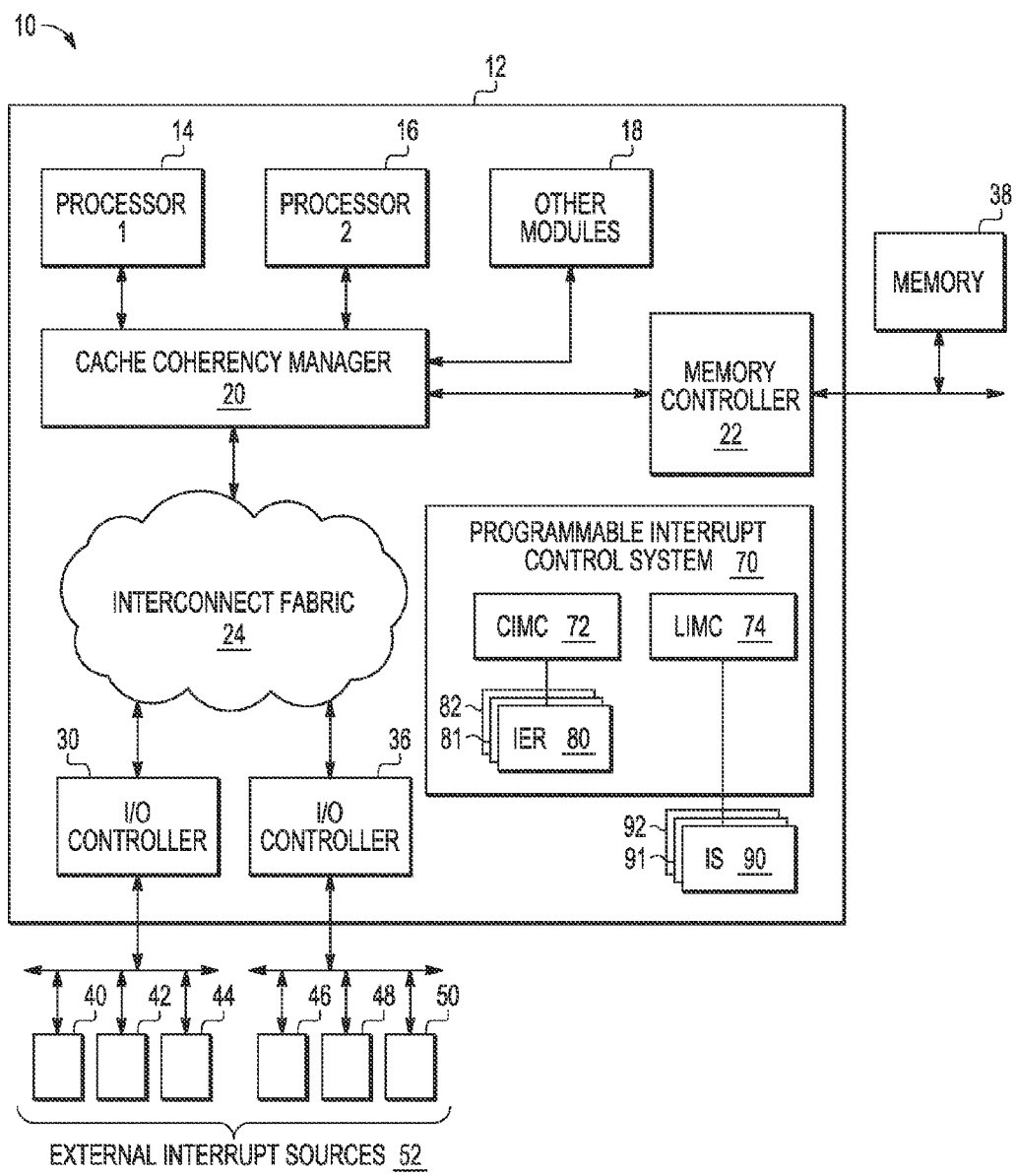
FIG. 1 is a simplified block diagram of a system-on-a-chip having a virtualized programmable interrupt controller system for managing interrupt requests from a plurality of interrupt sources by authenticating and interpreting write transactions to one or more specified interrupt event register addresses.

A system, apparatus, and methodology are described for signaling, receiving, and interpreting interrupt requests from one or more interrupt sources with a write-transaction-based interrupt management model which uses predetermined write transactions to a specified interrupt event register (IER) address to report interrupt source events which are authenticated and then interpreted using an interpretation table and associated configuration and interrupt state information, thereby simplifying the design and operation of the interrupt controller architecture, reducing the wire connection and die size requirements. When an interrupt source (or source adapter) has an interrupt event to report, the interrupt source/adapter generates a write transaction to a predetermined address for an interrupt management state machine interrupt event register at the interrupt controller. At the interrupt controller, the write transaction is authenticated, and upon acceptance, the current state of the targeted interrupt representing the state of the interrupt source is examined and the next state is generated based on the interpretation table. In this way, interrupt controller's version of the interrupt signal may be used in the same way that a received discrete signal would be used.

In this disclosure, an improved system, apparatus, and method for managing interrupts in a data processing system are described that address various problems in the art where various limitations and disadvantages of conventional solutions and technologies will become apparent to one of skill in the art after reviewing the remainder of the present application with reference to the drawings and detailed description provided herein. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Referring now to FIG. 1, there is shown a simplified block diagram 10 of a an integrated circuit 12 coupled to an external memory 38 and one or more external interrupt sources 52. The integrated circuit 12 includes one or more central processing units (CPUs) or processor cores 14, 16, cache coherency manager (CCM) 20, a memory controller 22, one or more on-chip network circuits or other interconnect fabric 24, one or more I/O controller circuits 30, 36, along with other circuit/modules 18. To process and manage interrupt requests, the integrated circuit 12 also includes a programmable interrupt controller system 70 which authenticates and interprets interrupt requests presented as write transactions to one or more specified interrupt event register (IER) addresses 80-82, where each IER may be associated with a corresponding state machine as described hereinbelow. Examples of interrupt sources include CPU/processor core(s) 14, 16 and/or one or more on-chip or internal interrupt sources 90-92 which use the LIMC 74 to report interrupts using write transactions. Interrupt sources may also include external interrupt sources 52, such as external sources 40, 42, and 44 coupled to I/O controller 30 and external sources 46, 48, and 50 coupled to I/O controller 36.

Though not shown, it will be appreciated that the resources of the system 10 may be divided into one or more groups or partitions so that different physical hardware resources (e.g., processors, controllers, and memory) are grouped together in a "partition" to perform a specified function (such as executing an operating system). In embodiments where a processor core implements multithreading, each hardware thread having a thread private architecture state may be considered to be a virtual processor core N, and is handled as an independent processor core by the interrupt system.

As depicted, the programmable interrupt controller system 70 includes one or more functional units 72, 74 for receiving and managing different types of interrupt requests from different interrupt sources. One or more of the functional units receives interrupt events generated by internal or external interrupt sources as write transactions. In selected embodiments, the write transactions may be authenticated and then interpreted based on configuration and state information to determine "next state" interrupt information that is sent to the processor/partition for processing. For example, the Central Interrupt Management Controller (CIMC) block 72 may include a plurality of interrupt management state machines which are each individually accessible in a local physical address map and assigned by software to specific interrupt sources as required for a particular application. The CIMC block 72 controls access to the state machines by performing address authentication on any received write transaction to an interrupt event register (e.g., 80) to confirm that the transaction is authorized to access the interrupt event register 80 targeted by the interrupt request. Upon authorized access, each interrupt state machine controls the state sequences for servicing a single interrupt source. When the CIMC block 72 receives an authorized write transaction, the arrival of the write transaction indicates a state change with respect to the discrete interrupt signal from the interrupt source. The state machine converts the write transaction into an interrupt event to be sent to the targeted processor. In this arrangement, an interrupt source can be any system resource that is capable of generating a write transaction that has access permissions to a CIMC state machine target.

In selected embodiments, the CIMC block 72 provides interrupt processing functionality by including a plurality of independent interrupt state machines, each of which is accessible in the local address space, and each having configuration information (e.g., interrupt type, destination, priority, level, etc.). These state machines are treated as a generic pool, and are assigned by system software to sources in the system by their address offset in the CIMC address map so that each potential interrupt source may be assigned its own state machine. Of course, a state machine may be shared by more than one interrupt source if desired. In operation, the CIMC block 72 may receive write transactions representing interrupt signal behavior from an interrupt source, and then map the transaction to a specific interrupt state machine based on the received address. If the received write transaction indicates an interrupt assertion from a source, the corresponding state machine is put into the "pending" state and the interrupt is submitted to the interrupt sorting hardware for delivery to the programmed interrupt target, etc. In other embodiments, the Legacy Interrupt Management Controller (LIMC) block 74 provides legacy device interrupt processing support (e.g., from discrete, single-wire interrupt signals). In selected embodiments, a legacy interrupt is understood to refer to a discrete, single wire interrupt signal that may be generated on-chip or internally as a level sensitive interrupt or from external interrupt pins. For example, the LIMC block 74 may process received legacy internal discrete wire and external pin interrupt signals by associating each legacy signal with a software-assigned local physical address and a software-defined data payload. Each change in the state of an interrupt signal results in a write transaction with the corresponding address and data payload. With the CIMC block 72 and LIMC block 74, interrupt requests can be presented as write transactions from any device that can legally generate a write, such as an internal interrupt from a CPU/processor core 14 or from any of the internal or external interrupt sources 40-52.

Figure 2:
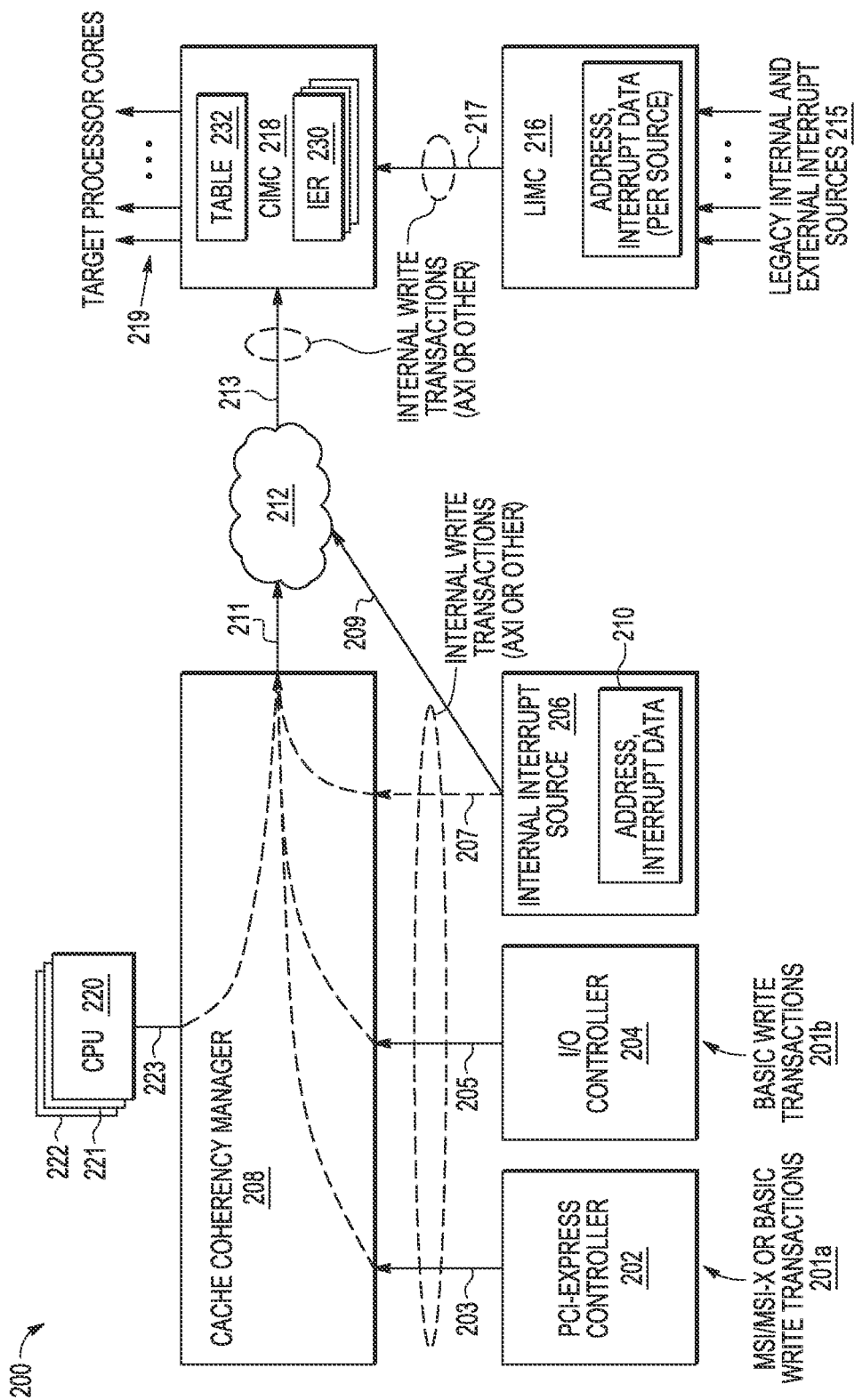
FIG. 2 is a simplified block diagram of an interrupt processing system for managing interrupt requests using a central interrupt management controller unit and/or a legacy interrupt management controller unit in accordance with selected embodiments of the present invention.

To illustrate selected example embodiments for processing different types of interrupt requests using a write transaction interrupt event signaling scheme, reference is now made to FIG. 2 which depicts a simplified block diagram of an interrupt processing system 200 for managing interrupt requests using a central interrupt management controller unit 218, alone or in combination with a legacy interrupt management controller unit 216. As depicted, the CIMC unit 218 is connected and configured to use one or more interrupt event registers 230 and a write transaction table 232 to authenticate and interpret write transactions as interrupt event reports (e.g., interrupt assert or de-assert) in place of using interrupt signals over dedicated interrupt wires. In operation, the interrupt processing system 200 receives, processes, and interprets interrupt events that are generated by different interrupt sources as write transactions 201, 207, 209, 223 to provide expected system behavior by supporting generic edge, rising/falling edge, and high/low level sensitive interrupt signaling behavior from the different interrupt sources. In this way, a variety of different interrupt sources can be supported, including but not limited to one or more internal interrupt source(s) 206, legacy internal and external interrupt source(s) 215, CPU interrupt source(s) 220-222, and/or external interrupt source(s) capable of generating write transactions 201. In addition, the interrupt processing system 200 may provide for secure interrupt event signaling to prevent unauthorized system resource generation of write transaction-based interrupt event signaling by requiring address authentication for performing write transactions to one or more interrupt event registers. Depending on the signaling mode for the interrupt source, each interrupt source which uses write transactions to signal interrupt events to the interrupt processing system 200 may be required to assert and de-assert interrupt signals in a controlled fashion in that they may not signal a new interrupt when they already have an outstanding interrupt request. Otherwise, the interrupt source and the interrupt controller can get out of sync and/or interrupts could be lost. As will be appreciated, this is typical interrupt source behavior anyway, so this requirement does not pose a significant burden on the interrupt sources.

In accordance with selected embodiments, the CIMC block 218 is connected to process a variety of different interrupt event reports, including write transactions 213 derived from external and CPU interrupt sources, internal and general I/O devices, and/or devices connected to a bus, such as PCI-Express devices, where each write transaction 213 includes a local physical address (corresponding to a specific interrupt state machine and associated IER in the pool of generic state machines in the CIMC block 218) and a data payload or message which may be software defined for delivery to the targeted virtual processor without modification or interpretation. In addition, the CIMC block 218 may be connected to process interrupt event reports signaled with write transactions 217 generated by the LIMC block 216 in response to interrupt state change signals from legacy internal and external interrupt sources 215. To support the different types of signaling modes from different interrupt sources (e.g., generic edge, rising/falling edge, and high/low level sensitive interrupt signaling), the CIMC block 218 maintains a number of interrupt event registers (IER) 230 assigned to interrupt sources as required for an application. Upon receiving an authorized write transaction to a specified IER 230 from an interrupt source, the CIMC block 218 uses a write transaction interpretation table 232 to implement a state machine for the interrupt source to determine the "next state" information for the interrupt source, based on the current state of the interrupt source and its specified interrupt signaling mode.

As seen with the example shown in FIG. 2, interrupt requests can be generated by any interrupt source that is capable of generating a write transaction that has access permissions to a state machine target IER in the CIMC block 218. For example, external interrupt events can be reported as basic write transactions 201b to an I/O controller 204. In response, the I/O controller 204 issues an internal write transaction 205 which specifies (after any required translation) the local physical address of the desired Interrupt Event Register (IER) 230 in the CIMC block 218, thus selecting the desired interrupt state machine. The internal write transaction 205 may also include a data payload or message that is not used to communicate the state change of the interrupt source so that the data payload can be opaque to the hardware and it can be completely managed by software. The resulting write transaction 205 is then passed to the cache coherency manager (CCM) 208 where it is forwarded (e.g., as an AXI write transaction 211) to the on-chip interconnect fabric/network 212 that is connected to the CIMC block 218. From the interconnect fabric/network 212, the internal write transaction 213 is sent to the CIMC block 218, where it may be assessed for access authorization to the IER 230. Upon storage of the data payload at the specified IER 230, the interrupt source effectively signals an interrupt event to the target interrupt state machine to begin the interrupt service process. To this end, the address for the write transaction 213 is used to index into the pool of generic state machines to locate the targeted state machine which interprets the write transaction 213 as a generic edge, rising/falling edge, and high/low level sensitive interrupt event signal based on the write interpretation table 232 and associated signaling mode and current state configuration data for the interrupt source using specified internal state bits which are visible in the state machine control and status registers. The interrupt source signal state change specified by the write transaction table 232 causes the necessary corresponding state changes in the state machine, and the CIMC block 218 sorts all of the pending interrupts for each interrupt target. When a new interrupt is selected, the CIMC block 218 delivers the new interrupt 219 to the targeted processor core.

As shown in FIG. 2, internal and general I/O interrupt events may also be reported using write transactions 207, 209 generated by an internal interrupt source 206 which uses stored address and interrupt data 210 for any write transaction interrupt event reporting. For example, the internal interrupt source 206 may issue a write transaction 209 directly to the interconnect fabric/network 212 which bypasses the CCM 208. Alternatively, the internal interrupt source 206 may issue an internal write transaction 207 to the CCM 208. In either case, the write transaction 207, 209 may include a data payload/message and an address which specifies (after any required translation) the desired local physical address of the Interrupt Event Register (IER) 230 in the CIMC block 218. By passing the write transaction 207, 209 through on-chip interconnect fabric/network 212 to the CIMC block 218, the resulting write transaction 213 may be assessed for access authorization to the addressed IER 230. Upon storage of the data payload at the addressed IER 230, the interrupt source 206 effectively signals an interrupt event to the target interrupt state machine to begin the interrupt service process by interpreting the write transaction 213 as a generic edge, rising/falling edge, and high/low level sensitive interrupt event signal based on the write interpretation table 232 and associated signaling mode and current state configuration data for the interrupt source using specified internal state bits, which are visible in the state machine control and status registers. In addition to the foregoing, interrupt events from CPU interrupt sources may also be reported via write transactions 223 generated by one or more CPU interrupt sources 220-222 using stored address and interrupt data for any write transaction interrupt event reporting. In this example, CPU-to-CPU interrupts follow the preceding model very closely, except they do not bypass the CCM 208.

Interrupt events may be reported as write transactions using a PCT-Express controller 202. In this example, MSI/MSI-X write transactions from an interrupt source or agent 201a may be presented as edge-triggered interrupts that are transported with ordinary PCI write transactions to predetermined addresses for an Interrupt Event Register (IER) 230. The IER address and a data message associated with each write transaction are assigned to the PCI-Express agent as part of the PCI-Express system configuration. Each write transaction 201a is processed at the PCI-Express controller 202 to generate an internal write transaction 203. Each PCI write transaction 203 is passed to the CCM 208 where the write transaction 211 is forwarded to the interconnect fabric/network 212, and is then sent as a write transaction 213 to the CIMC block 218. When the AXI write transaction 213 reaches the CIMC block 218, the write transaction 213 is assessed for access authorization to the addressed IER 230 which is used by the interrupt source to signal an interrupt event to the target interrupt state machine to begin the interrupt service process. If authenticated, the targeted state machine interprets the write transaction as a falling or a rising signal event based on a write interpretation table, the configured signaling mode and on specified internal state bits, which are visible in the state machine control and status registers. The interrupt source signal state change specified by the write transaction causes the necessary corresponding state changes in the state machine, and the CIMC block 218 sorts all of the pending interrupts for each interrupt target. When a new interrupt is selected, the CIMC block 218 delivers the new interrupt 219 to the targeted processor core.

In selected embodiments, the interrupt processing system 200 also processes interrupt signals generated by legacy interrupt sources over discrete, single-wire connections which provide interrupt event signaling. To convert legacy interrupt signals to write transactions in accordance with selected embodiments, the LIMC block 216 and CIMC block 218 may be connected to process legacy interrupt sources, such as legacy internal and external interrupt sources 215. In these embodiments, the legacy internal and external interrupt sources 215 are asserted and de-asserted, where the internal interrupts may all be level-sensitive, active high, and the external interrupt sources may be configurable as level or edge. As shown in FIG. 2, the LIMC block 216 receives and processes the internal and external interrupt signals 215 to provide internal write transactions 217 which includes a local physical address and a data payload or message, where the local physical address corresponds to a specific interrupt state machine and associated IER in the pool of generic state machines in the CIMC block 218, and where the interrupt data payload is software defined and is delivered to the targeted processor core without modification or interpretation. When the LIMC block 216 detects a state change in one of the legacy interrupt signals 215, the event is translated into a write transaction 217 which is targeted to the address in the source's data structure, with the interrupt data as payload. Though not shown, it will be appreciated that the write transaction 217 is not necessarily sent directly to the CIMC 218, but may instead be sent to the CCM 208 or interconnect fabric/network 212 for ultimate routing to the CIMC 218. Upon reaching the CIMC block 218, the write transaction 217 is assessed for access authorization to the addressed Interrupt Event Register (IER) 230 which is used by the legacy interrupt source to signal an interrupt event to the target interrupt state machine to begin the interrupt service process. If authenticated, the interrupt source signal state change specified by the transaction causes the necessary corresponding state changes in the target state machine, and the CIMC block 218 sorts all of the pending interrupts for each interrupt target. When a new interrupt is selected, the CIMC block 218 delivers the new interrupt 219 to the targeted processor core.

Figure 3:
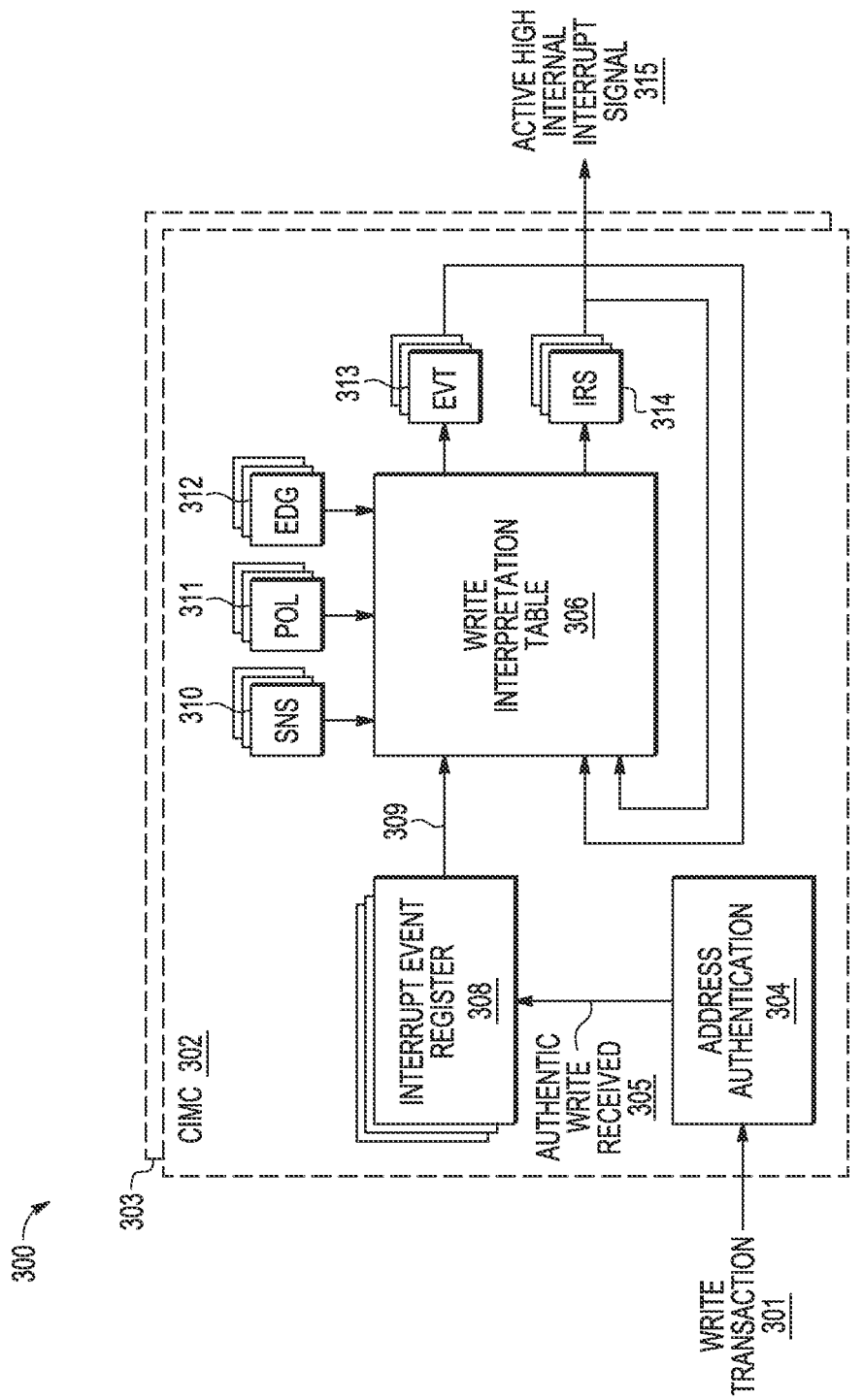
FIG. 3 is a simplified block diagram of a virtualized programmable interrupt controller system for managing interrupt requests received as write transactions by authenticating an address associated with the write request and interpreting the write transaction using static configuration information and predetermined interrupt state transition information in accordance with selected embodiments of the present invention.

To further illustrate selected embodiments of the secure write transaction-based interrupt event signaling scheme disclosed herein, reference is now made to FIG. 3 which shows a simplified block diagram 300 of a programmable interrupt controller (PIC) system in which one or more Central Interrupt Management Controller (CIMC) blocks 302-303 manage interrupt requests received as a write transaction 301. By way of example and not limitation, the depicted PIC system 300 may be used to implement the CIMC block 72 in FIG. 1 or the CIMC unit 218 shown in FIG. 2. For each interrupt source supported by the PIC, the received write transaction 301 from the interrupt source is addressed to an interrupt event register (IER) 308 for a specific interrupt state machine, and may be received as a translated write transaction from a legacy interrupt source or as a distinct write transaction from an external or CPU interrupt source, an internal or general I/O interrupt source, a PCI-Express MSI/MSI-X interrupt source, or from any authorized system resource.

To authorize access by the write transaction 301, the CIMC 302 may include an address authentication module or circuit 304 which authenticates the IER address associated with the write transaction 301 using any desired authentication or access authorization scheme. For example, an interrupt source is marked with a hardware-assigned attribute that identifies it as able to access a specific set of one or more of the interrupt state machines [IERs] implemented in the CIMC 302. When the source sends a write transaction 301 to the CIMC 302 to report an interrupt event, the CIMC 302 verifies that the source of the write transaction is authorized to access the requested state machine, thereby preventing an interrupt source from asserting someone else's interrupt, either accidently or maliciously. Once a write transaction 301 is authenticated, the authentication module/circuit 304 generates an authentication signal 305 to the Interrupt Event Register 308 indicating that the write transaction 301 has been authenticated to report a valid interrupt event. However, any unauthorized write transactions may be ignored or treated as accesses to reserved space, as an error, or as an illegal access attempt.

Once the write transaction 301 is authenticated (if required for the system), the write data may be saved in the Interrupt Event Register 308 for later use by software via 305. The act of writing the Interrupt Event Register 308 to report an event causes a state change for the associated interrupt state machine according to the write interpretation table 306 and state machine's associated static configuration information 310-312 and current interrupt state information 313-314. The targeted state machine uses the write interpretation table 306 via 309 to interpret the receipt of a write transaction as a falling or a rising signal event based on the configured signaling mode (indicated by configuration bits 310-312) and on two internal state bits (indicated at state bits 313-314), visible in the state machine control and status registers.

To illustrate an example embodiment of how the write interpretation table 306 and configuration/state bits 310-314 are used to generate an active high internal interrupt signal 315 for interrupt state machine use (one interrupt signal 315 per IER and associated state machine), reference is now made to FIG. 4 which depicts an example write transaction interpretation table 400 which is used by the CIMC 302 to examine the current state of the targeted interrupt (in the "Current State" column), and to generate the next state (in the "Next State" column) based on the signaling mode specified by the configuration bits 310-312 and current state bits 313-314. For example, a Sense (SNS) configuration bit 310 may specify the interrupt sensitivity type, where SNS=0 specifies an edge-sensitive signaling mode, and SNS=1 specifies a level-sensitive signaling mode. In addition, a Polarity (POL) configuration bit 311 may specify the interrupt polarity type, where POL=0 specifies an active-low or falling edge-triggered polarity, and POL=1 specifies an active-high or rising edge-triggered polarity. Finally, an Edge (EDG) configuration bit 312 may specify if a generic edge-triggered interrupt is used, where EDG=0 specifies that the interrupt signal characteristics are determined by the POL and SNS configuration settings, and EDG=1 specifies that the interrupt source is a generic edge-based device without any explicit "rise" or "fall." In selected embodiments, the Event (EVT) state bit 313 provides the interpretation of the previous interrupt event reported for the state machine, where EVT=0 specifies that the last reported interrupt event was a falling edge at the interrupt source, and EVT=1 specifies that the last reported interrupt event was a rising edge at the interrupt source. In selected embodiments, the Interrupt Request State (IRS) bit 314 is an internal active-high, level-sensitive representation of the interrupt source that tracks the current state machine interpretation of the request status of the interrupt source. Equivalent to an active-high level sensitive representation of the interrupt source, the IRS state bit may be set or cleared when an event is reported with a write to the IER register 308. If IRS=0, this may signal that the interrupt source has not signaled an interrupt, and if IRS=1, this may signal that the interrupt source has signaled an interrupt and is waiting for or is currently being serviced.

By applying the write interpretation table 400 of FIG. 4, the signaling mode specified with the EDG, POL, and SNS bit values is used to determine the next state for an interrupt source based on the initial or current state values. As depicted, the "Initial State" column of state values in the table 400 specifies the EVT and IRS state bit values assigned as the "Current State" for any "reset" condition which occurs, such as when the table is initially used or whenever there is a change in the signaling mode for an interrupt source. In addition, the "Current State" column provides the current EVT and IRS state values of the targeted interrupt, while the "Next State" column provides the next EVT and IRS state values corresponding to the existing signaling mode and current state values. Based on the current state values and the specified interrupt source signaling mode (which represents the PIC's understanding of the current state of the interrupt source), the CIMC 302 may use the write interpretation table 400 to generate the corresponding next state values at the output signal 315.

For example, when an interrupt event is reported by an interrupt source which uses an edge-triggered signaling mode (e.g., EDG=1), the CIMC 302 signals a new interrupt at output signal 315 by generating next state values EVT=0, IRS=1 if the examined current state values EVT=0, IRS=0. However, when the CIMC 302 is in the edge-triggered signaling mode (e.g., EDG=1) with current state values EVT=0, IRS=1, an interrupt event received at the CIMC 302 generates next state values EVT=0, IRS=1 indicating no state change. This is not well-behaved (since a new interrupt is being signaled when the source has already has an outstanding unserviced interrupt), but legal for PCI MSI/MSI-X messages which allow these interrupts to be lost. On the other hand, when the CIMC 302 is in the edge-triggered signaling mode (e.g., EDG=1) with current state value EVT=1, the CIMC 302 generates next state values EVT=1, IRS=x (don't care) to signal an illegal current state since the EVT=1 state should not be attainable. When operating in the edge-triggered mode, the IRS=1 state must be cleared by the interrupt service software since the interrupt source has no mechanism to communicate an interrupt de-assertion event.

The write interpretation table 400 may also be applied to interpret write transaction interrupt event reports from interrupt sources with falling edge-triggered signaling mode (e.g., EDG=0, POL=0, and SNS=0) so that, when an interrupt event is reported, the CIMC 302 signals a reset trigger (i.e., ready for a new interrupt event) at output signal 315 by generating next state values EVT=1, IRS=0 when the current state values EVT=0, IRS=0. In similar fashion, when the CIMC 302 receives an interrupt event from an interrupt source in the falling edge-triggered signaling mode with current state values EVT=0, IRS=1, the CIMC 302 will generate next state values EVT=1, IRS=1 to signal a reset trigger at output signal 315. However, when the CIMC 302 receives an interrupt event from an interrupt source in the falling edge-triggered signaling mode with current state values EVT=1, IRS=0, the CIMC 302 signals a new interrupt at output signal 315 by generating next state values EVT=0, IRS=1. On the other hand, when an interrupt event is reported to the CIMC 302 in the falling edge-triggered signaling mode with current state values EVT=1, IRS=1, the CIMC 302 generates next state values EVT=0, IRS=1 to indicate an error condition that should not happen when the interrupt source is well-behaved. When operating in the falling edge-triggered mode, the IRS=1 state must be cleared by interrupt service software since the interrupt source has no mechanism to communicate an interrupt de-assertion event.

The write interpretation table 400 may also be applied with interrupt sources using active-low level-sensitive signaling modes (e.g., EDG=0, POL=0, and SNS=1). The CIMC 302 current state EVT=1, IRS=0 is an illegal state and should never be encountered. This state indicates a logic bug or a failure in the hardware. Note that a state change to EVT=1, IRS=) is indicated to simplify the logic design. The CIMC 302 in the active-low level-sensitive signaling mode with current state values EVT=0, IRS=1 responds to an interrupt event by generating next state values EVT=1, IRS=0 to signal that an interrupt is being de-asserted at output signal 315. When an interrupt event is reported to the CIMC 302 that is in the active-low level-sensitive signaling mode with current state values EVT=1, IRS=0, the CIMC 302 signals a new interrupt at output signal 315 by generating next state values EVT=0, IRS=1. The CIMC 302 current state EVT=1, IRS=1 is an illegal state and should never be encountered. This state indicates a logic bug or a failure in the hardware. A state change to EVT=0, IRS=1 is indicated to simplify the logic design. When operating in the active-low level-sensitive mode, the IRS=1 state must not be cleared by interrupt service software since the interrupt source is required to communicate an interrupt de-assertion event.

The write interpretation table 400 may also be applied to interpret write transaction interrupt event reports from interrupt sources with rising edge-triggered signaling modes (e.g., EDG=0, POL=1, and SNS=0) so that the CIMC 302 generates next state values EVT=1, IRS=1 to signal a new interrupt at output signal 315 based on current state values EVT-=, IRS=0. On the other hand, when interrupt event is received at the CIMC 302 from an interrupt source in the rising edge-triggered signaling mode, the CIMC 302 will generate next state values EVT=1, IRS=1 when the current state values EVT-=0, IRS=1. In this case, the interrupt source is not well-behaved and this is an error condition. In the rising edge-triggered signaling mode, the CIMC 302 which receives an interrupt event based on current state values EVT=1, IRS=0 will signal a reset trigger (i.e., ready for a new interrupt event) at output signal 315 by generating next state values EVT=0, IRS=0. Similarly, the CIMC 302 may signal a reset trigger based on current state values EVT=1, IRS=1 by generating next state values EVT=0, IRS=1. When operating in the rising edge-triggered mode, the IRS=1 state must be cleared by interrupt service software since the interrupt source has no mechanism to communicate an interrupt de-assertion event.

Finally, the write interpretation table 400 may be applied with interrupt sources using active-high level-sensitive signaling modes (e.g., EDG=0, POL=1, and SNS=1), in which case the CIMC 302 responds to an interrupt event by generating next state values EVT=1, IRS=1 to signal a new interrupt at output signal 315 based on current state values EVT=0, IRS=0. The CIMC 302 current state EVT=0, IRS=1 is an illegal state and should never be encountered. This state indicates a logic bug or a failure in the hardware. A state change to EVT=1, IRS=1 is indicated to simplify the logic design. Correspondingly, the CIMC 302 current state EVT=1, IRS=0 is an illegal state and should never be encountered, and a state change to EVT=1, IRS=1 is indicated. The CIMC 302 which receives an interrupt event from an interrupt source in the active-high level-sensitive signaling mode may generate next state values EVT=0, IRS=0 to signal that an interrupt is being de-asserted at output signal 315 based on current state values EVT=1, IRS=1. When operating in the active-high level-sensitive mode, the IRS=1 state must not be cleared by interrupt service software since the interrupt source is required to communicate an interrupt de-assertion event.

To use the write interpretation table 306 shown in FIG. 4, each interrupt source (or source adapter) reports an interrupt event by generating a write transaction 301 to a predetermined address in the CIMC 302 specifying an interrupt management state machine Interrupt Event Register 308. When the write transaction is authenticated and accepted at the authentication module/circuit 304, the CIMC 302 accesses the write interpretation table 306 using the current state of the targeted interrupt (EVT 313 and IRS 314) and signaling mode configuration bits (SNS 310, POL 311, EDG 312) to generate and store the next state of the interrupt at the output state bit registers 313, 314, thereby outputting the active high internal interrupt signal 315 for use by the CIMC 302 to send an interrupt to the targeted processor core.

Figure 5:
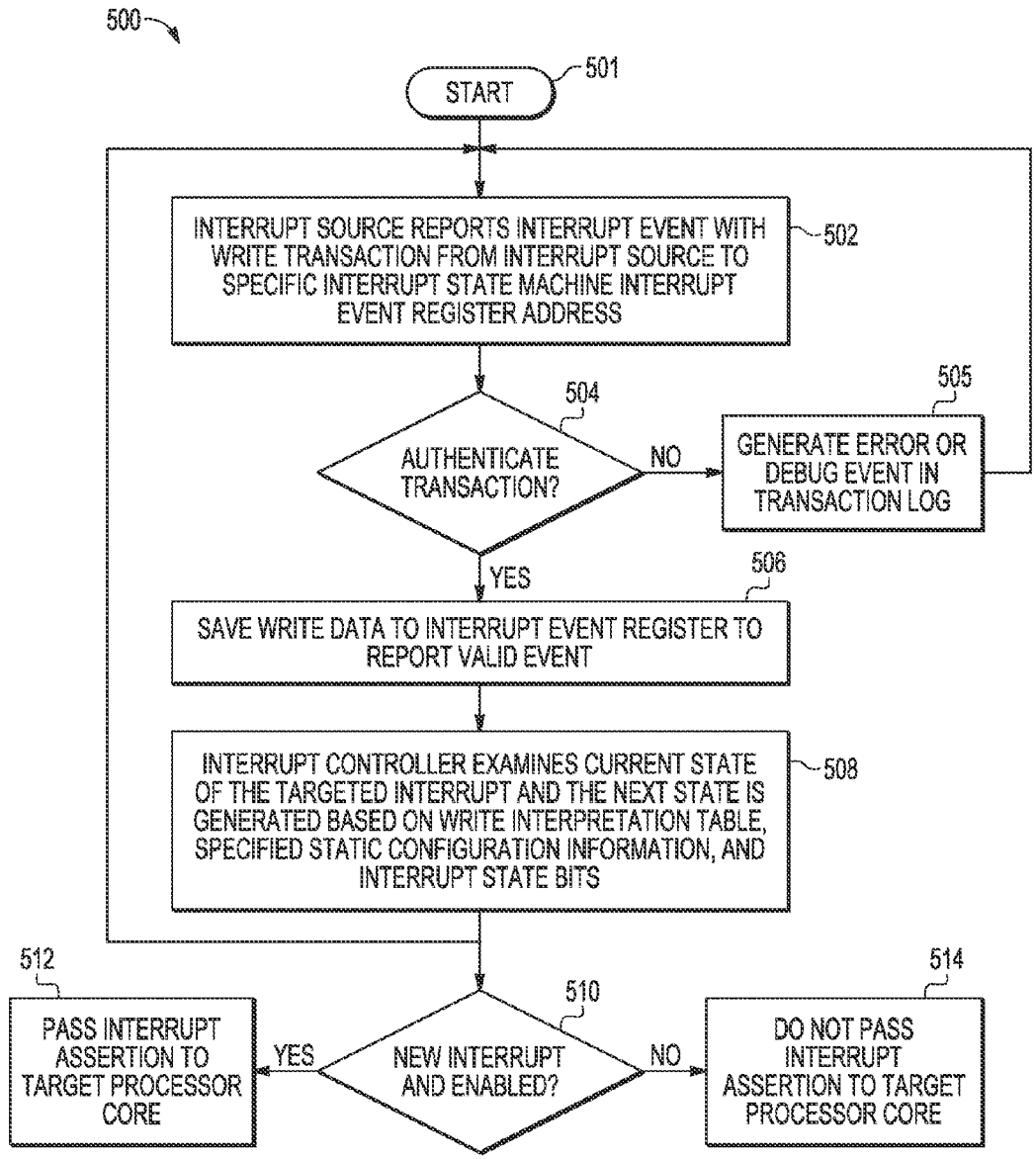
FIG. 5 depicts an example flow diagram according to a method for processing an interrupt request presented as a write transaction to an interrupt controller in accordance with selected embodiments of the present invention.

Referring now to FIG. 5, there is depicted an example flow diagram 500 of a method for processing an interrupt request presented as a write transaction to an interrupt controller in accordance with selected embodiments of the present disclosure. Once the method starts at step 501, an interrupt source reports an interrupt event to an interrupt target at step 502 by generating a write transaction to a specific interrupt event register associated with a specified interrupt state machine. As will be appreciated, an interrupt source may report an interrupt event upon detecting a change in its internal interrupt status (e.g., an interrupt status changes from de-asserted to asserted or vice versa). By providing a write transaction-based mechanism for signaling interrupt requests, the interrupt request may be generated by any interrupt source coupled to an interrupt controller, regardless of whether the interrupt source is internal or external to the data processing system. Thus, in addition to supporting internal and external interrupt sources, legacy interrupt signaling types can be supported or emulated using write transactions (messages) to the interrupt controller.

At step 504, to enforce system partitioning, the interrupt controller performs address authentication to determine whether the write transaction source is authorized to access the targeted interrupt state machine IER. Since the data payload is not used to communicate any event information to the interrupt controller, no data authentication is necessary and the entire data payload is available for software use. If the write transaction is not authenticated (negative outcome to authentication step 504), the method generates an error or debug event in a transaction log at step 505. In other embodiments, authentication violations could be treated as accesses to reserved space and have no effect on system operation. However, if the write transaction is authenticated (affirmative outcome to authentication step 504), the method saves the data payload of the write transaction to the specified interrupt event register at step 506, thereby reporting a valid interrupt event. Though not shown, it will be appreciated that the transaction authentication steps need not be used in all embodiments.

At step 508, the interrupt controller examines the current state of the targeted interrupt and generates the next state by using the write interpretation table, specified static configuration information, and interrupt state bits. By using the write transaction interpretation table, static configuration bits that define the signaling mode, and two bits of interrupt state information, all desired variants of interrupt signal emulation can be provided, including generic edge, rising/falling edge, and high/low level sensitive interrupt signaling. As will be appreciated, the ability to provide additional interrupt event reporting will depend on the signaling mode for the interrupt source. For example, with an interrupt source which uses active-high level-sensitive interrupt signaling, once a first interrupt has been reported, the interrupt source waits for interrupt servicing to be complete, and does not report another interrupt event it until the pending interrupt event is cleared by the interrupt target. However, for an interrupt source which uses edge-triggered interrupt signaling, the interrupt source may be enabled to report a second interrupt event since the second interrupt event will be interpreted by write transaction table as the trailing edge of an interrupt pulse.

At step 510, the interrupt controller determines if a new interrupt has been signaled and if the interrupt is enabled in the controller when determining whether to send the new interrupt on to the target processor core. If not (negative outcome to decision step 510), the interrupt controller does not send the interrupt assertion to the target processor core (step 514). But when reporting for new interrupt by the interrupt controller is enabled (affirmative outcome to decision step 510), the interrupt controller sends the interrupt assertion to the target processor core (step 512).

As will be appreciated, the write transaction-based interrupt event reporting mechanism and programming model disclosed herein provide a quick and efficient mechanism for signaling, receiving, and interpreting interrupt requests from one or more interrupt sources by defining predetermined write transactions to a specified interrupt event register (IER) address to report interrupt source events which are authenticated and then interpreted using an interpretation table and associated configuration and interrupt state information. In selected embodiments, the disclosed write transaction-based interrupt management mechanism may be embodied in hardware, in processing circuitry for executing software (e.g., including but is not limited to firmware, resident software, microcode, etc.), or in some combination thereof. Furthermore, the write transaction-based interrupt reporting mechanism may be embodied as a computer program product accessible from a computer-usable or computer-readable medium providing program code for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD. In addition, the non-transitory computer readable storage medium described herein may store special processor executable instructions which, upon execution, causes the processor to receive write transactions from an internal or external interrupt source by authenticating the write address before storing the write transaction data payload in one or more special purpose interrupt event registers to provide all desired variants of interrupt signal emulation.

By now it should be appreciated that there has been provided a circuit, method and system for managing interrupt requests provided to an interrupt controller as write transactions. In the disclosed methodology, a first interrupt source issues a write transaction representing an interrupt event for a targeted system resource, where the write transaction has a write address and a data payload. The first interrupt source may be an external off-chip interrupt source or an internal on-chip interrupt source. An interrupt controller receives the write transaction for the targeted system resource, and accepts the write transaction by (optionally) authenticating that the write address is authorized to access an interrupt event register associated with the first interrupt source. In this address-based authentication scheme, the acceptance of the write transaction does not require processing of the data payload from the write transaction. The interrupt controller also applies interrupt control logic to generate an interrupt request state signal for the first interrupt source in response to accepting the write transaction. As disclosed, the interrupt control logic is configured to interpret write transactions from a plurality of interrupt sources that use different types of interrupt signaling modes, such as interrupt sources using a generic edge-triggered interrupt signaling mode, a falling edge-triggered interrupt signaling mode, an active-low level-sensitive interrupt signaling mode, a rising edge-triggered interrupt signaling mode, and an active-high level-sensitive interrupt signaling mode. In selected embodiments, the interrupt request state signal is generated by using a state machine at the interrupt controller that is targeted by the first interrupt source to convert the write transaction into the interrupt request state signal. In addition, the interrupt request state signal may be generated by applying selected signaling mode and state bits to a transaction interpretation table to generate the interrupt request state signal. For example, the interrupt control logic may be operative to generate an interrupt request state signal by examining the current state bits and signaling mode bits associated with the interrupt request in a write transaction table, and then generating one or more bits of next state information for the interrupt request using the plurality of current state bits and signaling mode bits from the write interpretation table. In selected embodiments, the signaling mode bits may include a sense configuration bit specify an interrupt sensitivity type, a polarity configuration bit specifying an interrupt polarity type, and an edge configuration bit specifying whether a generic edge-triggered interrupt is used. In addition, the current state bits may include an event state bit specifying a interrupt request state signal previously generated by the interrupt control logic, and an interrupt request state bit specifying an internal active-high, level-sensitive representation of the current state of the first interrupt source. Once the interrupt request state signal is generated, it may be sent to the targeted system resource.

In another form, there is provided a data processing system and associated method of processing interrupt event signals. As disclosed, the data processing system includes plurality of interrupt sources for generating interrupt events using different types of interrupt signaling modes. For example, the interrupt sources may include one or more internal or external interrupt sources that are capable of generating interrupt events by sending a write transaction to one of the plurality of interrupt event registers using a predetermined write transaction. The data processing system also includes a programmable interrupt management controller for receiving and processing received write transactions representing interrupt events, where each write transaction includes a data payload and a write address for one of the plurality of interrupt event registers associated with said interrupt source, where the data payload in each write transaction is not used to signal an interrupt event. The programmable interrupt management controller may include a plurality of interrupt event registers and an interrupt control logic unit. The interrupt event registers receive write transactions which signal interrupt events, where each interrupt event register corresponds to one of the plurality of interrupt state machines. The interrupt control logic unit generates an interrupt request state signal for each interrupt state machine in response to accepting the write transaction using interrupt control logic that is configured to interpret write transactions from a plurality of interrupt sources that use different types of interrupt signaling modes. In selected embodiments, the interrupt control logic is embodied in a write transaction table for interpreting write transactions from the plurality of interrupt sources to generate corresponding interrupt request state signals for each interrupt source. In this way, the configuration logic may be configured to interpret write transactions from interrupt sources using a generic edge-triggered interrupt signaling mode, a falling edge-triggered interrupt signaling mode, an active-low level-sensitive interrupt signaling mode, a rising edge-triggered interrupt signaling mode, and an active-high level-sensitive interrupt signaling mode. To this end, the write transaction table may include a plurality of configuration values (EDG, POL, SNS) corresponding to the plurality of different types of interrupt signaling modes (e.g., edge-triggered, falling/rising edge-triggered, and active-low/high level-sensitive), where each configuration value has a plurality of current state values (IRS, EVT) and a corresponding plurality of next state values (IRS, EVT), where the interrupt control logic is configured to access the write transaction table by examining a current state value for a specified configuration value and outputting the corresponding next state value (IRS). In operation, the write transaction table may be accessed by applying selected signaling mode and state bits to generate the interrupt request state signal for the interrupt source. In order to authorize a write transaction access to an interrupt event register, the data processing system may include an address authentication circuit for accepting the write transaction at the programmable interrupt management controller by authenticating that the source of the write transaction is authorized to access the addressed interrupt event register. The disclosed data processing system may also include a legacy interrupt management controller (e.g., LIMC) connected to receive one or more interrupt requests from an interrupt source that is signaled on one or more dedicated interrupt wires, and to generate therefrom one or more write transactions to the programmable interrupt management controller.

In yet another form, there is provided an interrupt management controller and associated method of interrupt processing. In the disclosed interrupt management controller, an address authentication circuit authenticates the transaction source and the write address portion of each write transaction received at the interrupt management controller. In addition, a plurality of interrupt event registers store a data payload portion of each write transaction received at the interrupt management controller, where each write transaction is generated by an interrupt source to signal an interrupt event, and where each interrupt event register corresponds to one of a plurality of interrupt state machines which use a plurality of different types of interrupt signaling modes. The interrupt management controller also includes interrupt control logic in each state machine to convert each write transaction to the state machine's interrupt event register into a corresponding interrupt request state signal by accessing a write transaction table using selected signaling mode configuration bits, an event state bit providing an interpretation of a previously reported interrupt event, and an interrupt request state bit providing an internal active-high, level-sensitive representation of the interrupt source's interrupt request status.

Although the described exemplary embodiments disclosed herein are directed to methods and systems for managing write transaction-based interrupt requests using address authentication and transaction interpretation tables, the present invention is not necessarily limited to the example embodiments illustrate herein, and various embodiments of the write transaction-based interrupt processing components and methods disclosed herein may be implemented with other circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "by," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of managing interrupt requests, comprising:
receiving at an interrupt controller a write transaction representing an interrupt event for a targeted system resource, where the write transaction is generated by a first interrupt source and comprises a write address and a data payload;
generating an interrupt request state signal for the first interrupt source in response to accepting the write transaction using interrupt control logic at the interrupt controller which is configured to interpret write transactions from a plurality of interrupt sources that use different types of interrupt signaling modes by applying selected signaling mode and state bits to a transaction interpretation table to generate the interrupt request state signal.

2. The method of claim 1, where the interrupt control logic is configured to interpret write transactions from at least two of the following interrupt sources: a first interrupt source using a generic edge-triggered interrupt signaling mode, a second interrupt source using a falling edge-triggered interrupt signaling mode, a third interrupt source using an active-low level-sensitive interrupt signaling mode, a fourth interrupt source using a rising edge-triggered interrupt signaling mode, and a fifth interrupt source using an active-high level-sensitive interrupt signaling mode.

3. The method of claim 1, where the first interrupt source is an external off-chip interrupt source or an internal on-chip interrupt source.

4. The method of claim 1, where generating the interrupt request state signal comprises using a state machine at the interrupt controller that is targeted by the first interrupt source to convert the write transaction into the interrupt request state signal.

5. The method of claim 1, where generating the interrupt request state signal comprises:
examining a plurality of current state bits and signaling mode bits associated with the interrupt request in a write transaction table; and
generating one or more bits of next state information for the interrupt request using the plurality of current state bits and signaling mode bits from the write interpretation table.

6. The method of claim 5, where the signaling mode bits comprise a sense configuration bit specify an interrupt sensitivity type, a polarity configuration bit specifying an interrupt polarity type, and an edge configuration bit specifying whether a generic edge-triggered interrupt is used.

7. The method of claim 5, where the current state bits comprise an event state bit specifying a interrupt request state signal previously generated by the interrupt control logic, and an interrupt request state bit specifying an internal active-high, level-sensitive representation of the current state of the first interrupt source.

8. The method of claim 1, further comprising sending the interrupt request state signal to the targeted system resource.

9. The method of claim 1, further comprising accepting the write transaction at the interrupt controller by authenticating that the first interrupt source is authorized to access an interrupt event register addressed by the write address.

10. The method of claim 9, where accepting the write transaction does not require processing of the data payload from the write transaction.

11. A data processing system comprising a programmable interrupt management controller, comprising:
a plurality of interrupt event registers for receiving write transactions which signal interrupt events, where each interrupt event register corresponds to one of a plurality of interrupt state machines, and
an interrupt control logic unit for generating an interrupt request state signal for each interrupt state machine in response to accepting a write transaction using interrupt control logic that is configured to interpret write transactions from a plurality of interrupt sources that use different types of interrupt signaling modes by applying selected signaling mode and state bits to access a write transaction table to generate the interrupt request state signal for the interrupt source.

12. The data processing system of claim 11, where each write transaction comprises a data payload and a write address for one of the plurality of interrupt event registers associated with said interrupt source, where the data payload in each write transaction is not used to signal an interrupt event.

13. The data processing system of claim 11, further comprising a plurality of internal or external interrupt sources for generating interrupt events using different types of interrupt signaling modes, where each interrupt source is capable of generating interrupt events by sending a write transaction to one of the plurality of interrupt event registers using a predetermined write transaction.

14. The data processing system of claim 11, further comprising an interrupt management controller connected to receive one or more interrupt events from an interrupt source that is signaled on one or more dedicated interrupt wires, and to generate therefrom one or more write transactions to the programmable interrupt management controller.

15. The data processing system of claim 11, where the interrupt control logic is configured to interpret write transactions from a first interrupt source using a generic edge-triggered interrupt signaling mode, from a second interrupt source using a falling edge-triggered interrupt signaling mode, from a third interrupt source using an active-low level-sensitive interrupt signaling mode, from a fourth interrupt source using a rising edge-triggered interrupt signaling mode, and from a fifth interrupt source using an active-high level-sensitive interrupt signaling mode.

16. The data processing system of claim 11, where the write transaction table comprises a plurality of configuration values corresponding to the plurality of different types of interrupt signaling modes, where each configuration value has a plurality of current state values and a corresponding plurality of next state values, where the interrupt control logic is configured to access the write transaction table by examining a current state value for a specified configuration value and outputting the corresponding next state value.

17. The data processing system of claim 11, where the interrupt control logic comprises a write transaction table for interpreting write transactions from the plurality of interrupt sources to generate corresponding interrupt request state signals for each interrupt source.

18. The data processing system of claim 11, further comprising an address authentication circuit for accepting the write transaction at the programmable interrupt management controller by authenticating that an interrupt source is authorized to access an interrupt event register.

19. An interrupt management controller comprising:
- an address authentication circuit for authenticating a transaction source and a write address portion of each write transaction received at the interrupt management controller;
- a plurality of interrupt event registers for storing a data payload portion of each write transaction received at the interrupt management controller, where each write transaction is generated by an interrupt source to signal an interrupt event, and where each interrupt event register corresponds to one of a plurality of interrupt state machines which use a plurality of different types of interrupt signaling modes; and
- interrupt control logic in each state machine to convert each write transaction to an interrupt event register for a state machine into a corresponding interrupt request state signal by accessing a write transaction table using selected signaling mode configuration bits, an event state bit providing an interpretation of a previously reported interrupt event, and an interrupt request state bit providing an internal active-high, level-sensitive representation of the interrupt request status for an interrupt source.

* * * * *